3,533,683
DYNAMIC PUPILLOMETERS USING TELEVISION CAMERA SYSTEM
Lawrence Stark and Anne Troelstra, Chicago, Ill., assignors, by mesne assignments, to Whittaker Corporation, Los Angeles, Calif., a corporation of California
Filed June 13, 1967, Ser. No. 645,800
Int. Cl. A61b 3/00, 3/10
U.S. Cl. 351—1                                       8 Claims

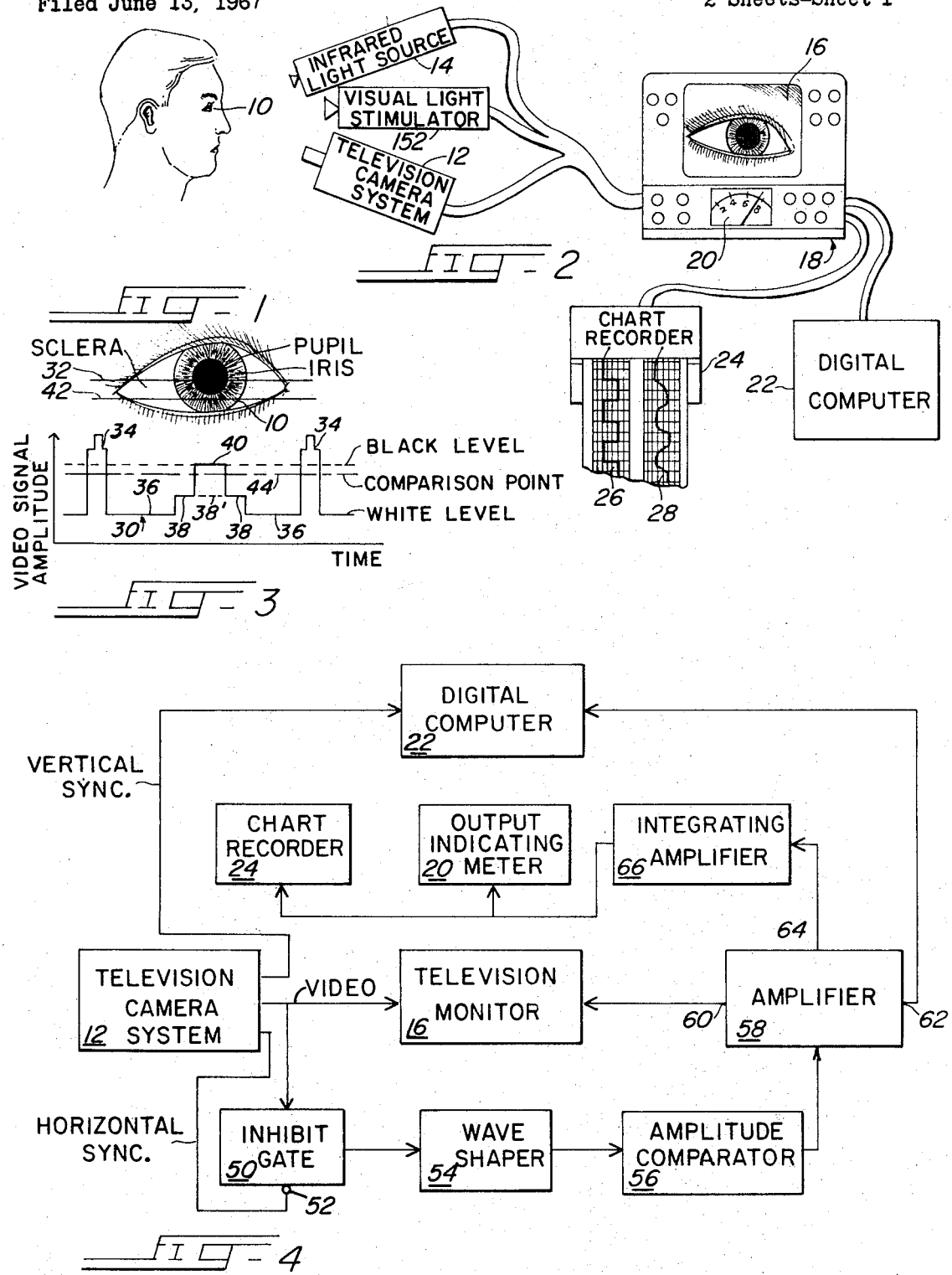

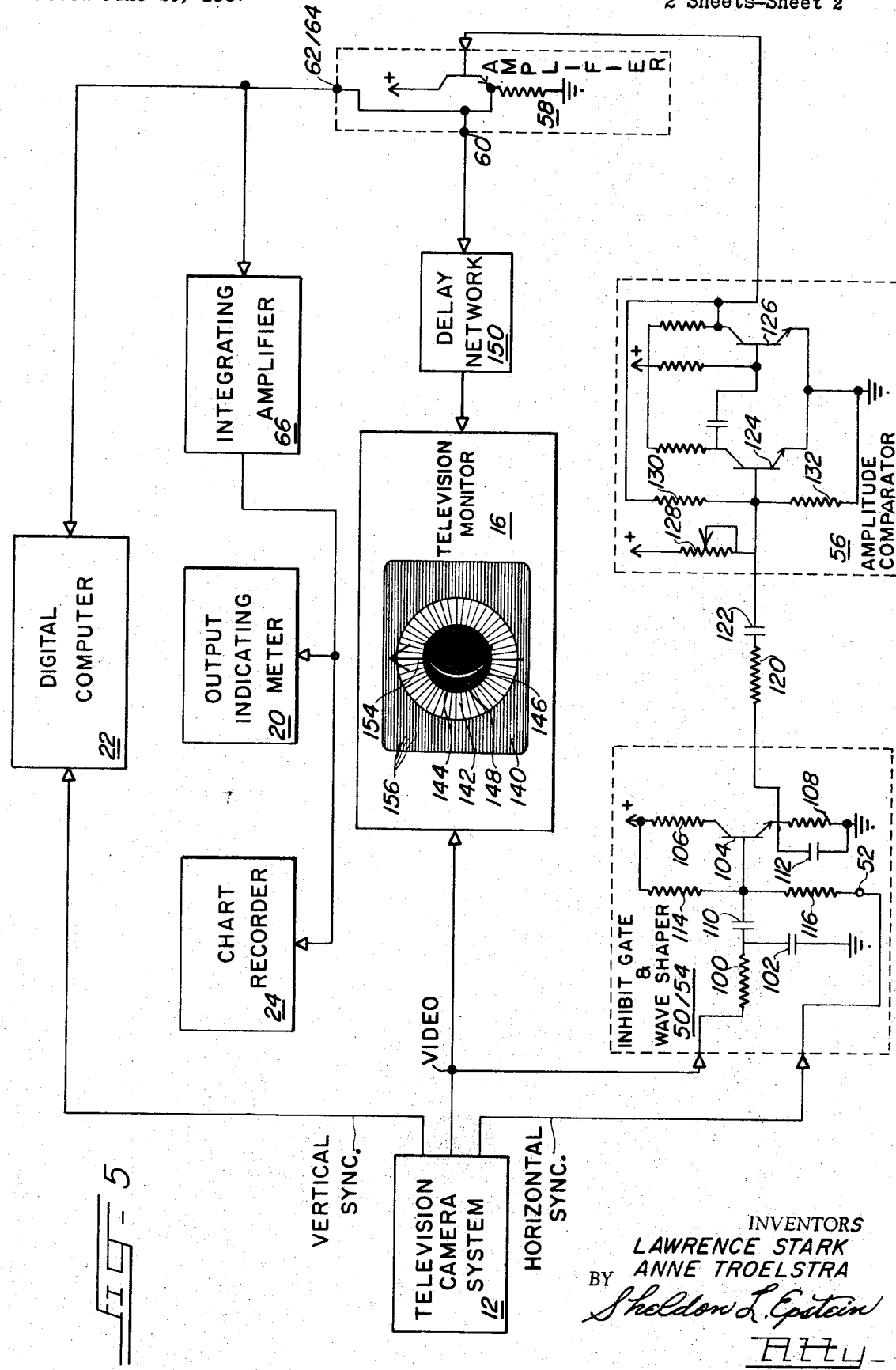

ABSTRACT OF THE DISCLOSURE

Dynamic pupillometers for measuring the size of the pupil of an eye and the response of the pupillary control system include a closed circuit television system for transducing an image of the eye into video signals and a circuit for analyzing the video signals to determine the instantaneous size of the pupil by counting the number of television scanning lines which traverse the image of the pupil as indicated each time the dark video signal from the pupil reaches a signal amplitude comparison point established by an amplitude comparator.

BACKGROUND OF INVENTION

Field of invention

This invention is in the field of medical diagnostic systems and, more particularly, is a new dynamic pupillometer for determining the instantaneous size of a pupil as the pupillary control system is exposed to various stimuli.

Description of prior art

The development of adequate instrumentation for the study of dynamic pupil movements has been a continuing activity of physiologists since at least 1887. Real impetus for the development of accurate dynamic pupillometers did not arise, however, until after World War II when the development of the new science of cybernetics stimulated in the investigation of the central nervous system as a combination of servomechanisms.

Of the host of biological servomechanisms available for analysis, the pupillary system was chosen because its motor mechanism, the iris, lies behind the transparent cornea in an exposed position which can be conveniently measured without requiring dissection. When compared with other biological servomechanisms, the pupillary system has other experimental advantages in that the system can be disturbed or driven by a number of different stimuli including light, a form of energy easy to control and painless to administer, and the system responds with a movement having only one degree of freedom, a change in pupil size, which simplifies the system analysis.

The difficulties in experimenting with the pupillary system are that the pupil cannot always be observed directly because the visible light required for accurate observation would act as a stimulus and change the pupil size; and that the change in pupil size, the diameter of the human pupil varies between 2 mm. and 9 mm., is difficult to monitor accurately if there are even slight movements of the eye or the head in the course of an experiment.

One of the first solutions to the problem of observing the pupil without causing the size of the pupil to change at the moment of observation was flash photography. It had obvious experimental limitations and because of these it could only be used when the pupil had reached a constant size. Because it could not be used to measure transient responses, it was called a static pupillometer.

An improved method for observing the size of the pupil without incurring the limitations of flash photography comprised the step of irradiating the eye with invisble radiation, such as infrared light, to form an image which could be photographed and later analyzed (see Pat. No. 2,573,464 to Lowenstein, et al. for a high speed motion picture system) or viewed with an image converter (see Koomen, et al., An Infrared Pupillometer, Journal of the Optical Society of America, vol. 38, No. 8, August 1948, pp. 719–22).

While the infrared systems described by Lowenstein, et al. and Koomen, et al. were markedly superior to their predecessors in that they made it possible for physiologists to learn something of the transient behavior of the pupillary servomechanisms, they were too costly, too complex and too slow for experimental or diagnostic use. It remained for Stark to introduce the first truly dynamic (transient response sensitive), low cost, infrared pupillometer which satisfied laboratory operating requirements (see Pat. No. 3,036,568 to Stark), and which made the first detailed analysis of the transient response of the pupillary servomechanism possible (see Stark, Stability, Oscillations and Noise in the Human Pupil Servomechanism, Proceedings of the Institute of Radio Engineers, vol. 47, No. 11, November 1959, pp. 1925–39).

The Stark pupillometer described in Pat. No. 3,036,568 comprised means for irradiating the eye with infrared light and means for detecting the amount of infrared energy reflected back from the eye. Whereas the pupil reflects very little incident infrared radiation, the iris is at least partially reflective. The Stark pupillometer exploited this phenomenon by dynamically measuring the amount of infrared light reflected from the iris at a lateral angle with respect to the optical axis of the eye as this is an inverse function of the instantaneous size of the pupil.

While the Stark pupillometer which has been described is a clinically operational instrument, it requires a high degree of care to obtain consistent results. The principal reason for this is that it is sensitive to variations in optical conditions which occur from subject to subject. Thus for a given pupil size, the Stark pupillometer will generate different readings for blue-eyed and brown-eyed subjects. This requires that the pupillometer be calibrated, by means such as a flash photograph, before the end of each experimental or examination. Further, the Stark pupillometer is somewhat sensitive to the gross movement of the eye or the head during use.

Principally to avoid these shortcomings, Lowenstein and Loewenfeld developed an electromechanical pupillograph comprising means for irradiating the eye with a sequential series of infrared scanning lines, means for transducing the reflected infrared signal into an electrical signal, and means for analyzing the electrical signal to determine the time required for scanning the longest path (the diameter) across the pupil from which the size of the pupil could be computed by knowing the scanning speed (see Lowenstein and Loewenfeld, Electronic Pupillography, A.M.A. Archives of Opthamology, vol. 59, March 1958, pp. 352–63 and King, An Improved Electronic Pupillograph for Clinical Use, Proceedings of the National Electronics Conference, vol. 16, 1960, pp. 672–76).

In the Lowenstein and Loewenfeld system, a series of square wavevs are generated as the iris and the pupil are scanned by successive infrared scanning lines. With regard to the segments of the scanning lines traversing the pupil, the amplitudes of the pupil portions of the square wave signals are all the same; however, the durations of the square waves vary as a direct function of the amount of time required to scan across the pupil along each of the different scanning lines. Clearly, the scanning line located along the diameter will produce the longest square wave pulse. To obtain information on the diameter or the maximum dimension of the pupil, the train of square wave pulses is integrated, one pulse at a time, to produce a train of triangle waves, the amplitude of each being a direct function of the duration of its associated square wave. The tallest of these triangle waves, which is related to the longest square wave pulse and therefore the diameter of the pupil, is detected by a peak voltage sensitive indicating device.

While the Lowenstein and Loewenfeld pupillometer attained its stated objectives; namely, freedom from the need for recalibration and freedom from sensitivity to small movements of the eye, its electromechanical scanning system placed a limit on scanning resolution.

In an effect to overcome this limitation and to obtain better instrument flexibility with a system that retained all of the advantages of scanning; Asano, Stark, et al. developed two separate television pupillometer systems (see Asano, et al., Pupillometery, Quarterly Progress Report No. 66, Research Laboratory of Electronics, Massachusetts Institute of Technology, July 15, 1962, pp. 404–12).

The first of these pupillometers comprised means for irradiating the eye with infrared light, an image converter and an interlaced linear scanning television camera for transducing the image of the eye into electrical signals, a video signal clipper for clipping maximum and minimum video signal levels so that only portions of the video signal related to sync pulses and portions of the video signal related to the pupil are transmitted to the following stages, a sampling integrator for integrating the pulses passed by the clipper, and a peak detector for measuring the output of the integrator. As the pupil portions of the video signal were clipped to a constant amplitude, only the durations of the pulses contained any information. By integrating these pulses, triangle waves were obtained whose amplitudes were a function of the durations of the pupil portions of the video signal. The amplitude of the largest triangle wave was measured by the peak detector and multiplied by a constant to determine the pupil diameter.

The second of these pupillometers was a flying spot television system in which the scanning spot was made to continuously scan around the pupil-iris boundary of the eye. As described in greater detail in the reference, this system was developed to furnish information on both pupil area and on eye position as the pupil area can be computed from the A.C. components of the deflection signals and the eye position can be computed from the D.C. components of the deflection signals.

While both of these pupillometers provided the experimental flexibility which is typical of television monitors, the added benefits did not offset the introduction of large errors caused by the movements of the eye within the plane of focus and along the optical axis of the camera, the higher cost and the increased complexity of the instrumentation.

Troelstra, Boogaard and van Doorne recognized the potential advantages of television pupillometers; however, they concluded that the construction of the optics for a system would be rather critical and that the requirements of linearity and contrast detection which would have to be met to obtain reliable signals were too expensive. For these reasons, they abandoned further research on a television system and concentrated on developing a simpler pupillometer based on the Lowenstein and Loewenfeld concept of electromechanical scanning (see Troelstra, et al., A Digital Pupillometer, Institute for Perception RVO–TNO, Soesterberg, The Netherlands, Report No. IZF 1965–7; also published in Medical Research Engineering, vol. 5, No. 3, 3rd Quarter, 1966, pp. 11–15).

The Troelstra, et al. system comprised an electromechanical scanning system for scanning the eye with a series of infrared scanning lines, means for transducing the reflected infrared energy into electrical signals, and means for determining from the electrical signals how many scanning lines traversed the pupil. As each scanning line was separated from its adjacent lines by an equal distance, the separation distance when multiplied by the number of lines which have traversed the pupil yielded the pupil diameter.

Although the Troelstra, et al. pupillometer represented a substantial improvement over the instruments which preceded it, it also suffered from the limitations inherent in electromechanical systems. Principally, these were low resolution, low instrument flexibility, the requirement for a large percentage of specially made components and the need for a special means for monitoring the response of the instrument while it is in use.

The first three of these limitations were principally the result of using an electromechanical scanning disc or element. In the Troelstra, et al. pupillometer, as described in their article, a disc 10 inches in diameter and containing 100 scanning holes was used to generate a 100 line scanning pattern. Each hole was 0.2 mm. in diameter had to be carefully drilled at a precise point along a spiral locus to obtain proper linearity and accuracy. The disc, in turn, was carefully journaled in alignment with an accurately oriented optical system for imaging the scanning pattern or raster on the pupil plane and then carefully dynamically balanced so that it could be rotated at 2700 r.p.m. without developing vibrations which would cause it to lose registration with the optical system.

As an instrument package, the Troelstra, et al. pupillometer was relatively inflexible because the size of the 10 inch disc made the use of a binocular system or a system in which the light or other stimulus was generated at a distance behind the disc impractical. Further, as the electromechanical unit was relatively large and bulky, as well as sensitive to shock, it could not readily be moved or reoriented to change the direction of the scanning lines to measure pupil reactions of various animals, such as the cat, which do not have circular pupils. Particularly in the case where it was not possible to restrain the movement of the subject's head or eyes (as in the case of an animal), the alignment of the scanning lines over the eye was exceedingly difficult as the infrared scanning lines were invisible. Therefore, the frequent or constant use of an image converter or an electronic system to recreate an image of the eye from the received signals was necessary to assure accurate alignment of the pupillometer during experiments in which the subject's eyes or head were permitted to move.

As these instrument constraints restricted experimental and clinical use, they placed a limit on the types of research and study of the pupillometer system which could be undertaken and the results which could be obtained.

Accordingly, it is a principal object of this invention to provide high resolution, dynamic, low cost pupillometers capable of accommodating large movements of a subject's eyes and comprising readily available components combined in highly flexible instrument packages which are readily adaptable for advanced research and clinical investigations.

Another principal object of this invention is to provide pupillometers which can be used to monitor the pupil responses of both animals and humans in a wide variety of experimental and clinical test facilities.

These and other objects, features and advantages of this invention will be more readily understood from the following detailed description of a preferred embodiment in which:

FIG. 1 is a plan view of a human eye;

FIG. 2 is a perspective view showing how a pupillometer of this invention is used to meausre the pupillary response of a human subject to light stimuli;

FIG. 3 is an oscillogram of a video signal generated by scanning the eye of FIG. 1 along straight scanning lines;

FIG. 4 is a block diagram of an embodiment of a pupillometer system of this invenion; and FIG. 5 is a combination schematic and block diagram of the system of FIG. 4.

DESCRIPTION OF THE PREFERRED EMBODIMENT

As explained above, a basic function of a pupillometer is the measurement of a dimension of the pupil of an eye. A plan view of a human eye 10 is shown in FIG. 1. For the purposes of this description, the three basic elements of the eye are the white area known as the sclera, the pigmented area known as the iris, and the black area known as the pupil. In the human eye, the outer circumference of the iris is generally about 15 mm. in diameter while that of the pupil varies in response to different stimuli within the range of 2 to 9 mm.

While the response of the human pupillary servomechanism is relatively slow as indicated by its linear transfer function $$G(s) = \frac{0.25\ e^{-0.2s}}{(1+0.1s)^3}$$

(see Stark, Biological Rythms, Noise And Asymmetry In The Pupil-Retinal Control System, Annals of the New York Academy of Sciences, vol. 98, Article 4, Oct. 30, 1962, pp. 1096–1108), it is relatively difficult to measure the size of the pupil because even with the head fixed the human eye can rotate through arcs in both the horizontal and vertical directions of about 100 degrees. Further, even if the subject is provided with a fixation point, the eye tracking control system causes the eye's position to oscillate through a range of a few millimeters in a mode similar to that of a limit cycle of a sampled-data control system.

Because of these characteristics, a pupillometer must be able to measure pupil size to within a fraction of a millimeter independently of pupil position, velocity or acceleration. Furthermore, it is desirable that the pupillometer be adaptable for use on a wide variety of pupils ranging from that of the human eye whose pupil area varies between 2 to 40 mm.$^2$ to the pupil of a screech owl's eye which varies in area from 6 to 115 mm.$^2$ (see Bishop & Stark, Pupillary Response of the Screech Owl, Ottus asio, Science, vol. 148, N. 3678, June 25, 1965, pp. 1750–52).

One embodiment of a pupillometer of this invention which can fulfill these requirements is illustrated in FIG. 2. The first element of the pupillometer is a television camera system 12 including means for scanning an image of the eye 10 which is formed on the camera tube along lines of a predetermined scanning pattern to produce a video signal of the image. To form the image on the camera tube, a light source 14 irradiates the eye. In some experiments using a variable intensity light stimulus, infrared radiation beyond the visible spectrum should be used as light of this wavelength does not cause any pupil reaction; however, in most studies (including some in which a light stimulus is used) near-infrared radiation which is slghtly visible is used to avoid the need for image converters or special television camera tubes for transducing the image of the eye into a video signal. Accordingly, the term "invisible radiation" as used herein includes not only radiation of a wavelength outside the visible spectrum but also visible radiation which does not cause any significant pupil response or any pupil response which inteferes with the experiment or clinical study.

In the illustrated embodiment, the predetermined scanning pattern of the television camera system 12 is a linearly spaced, straight line scanning raster containing a total of 525 lines divided into two equal interlaced fields, each cycle of which is completed in 1/60 of a second. This camera system is suggested because it is readily available and because its video signals are compatible with a home entertainment-type television receiver which can serve as a monitor 16 for reproducing a picture of the eye during operation of the instrument to insure proper aiming and focusing of the camera system 12 during use.

Under most experimental conditions, a 525 line raster provides more than adequate resolution for measuring the pupillary response as the camera system 12 can easily be aligned so that 125 or more scanning lines of each scanning field traverse the pupil at all times, as compared with a maximum of 40 lines which is attainable with an electromechanical pupillometer which generates a scanning pattern of 100 lines or less. Where increased resolution is required, the camera can be moved closer to the subject or a longer focal length lense can be used for a given camera-to-subject distance and the camera can be continuously adjusted to track the path of the eye by observing the pupil's picture on the monitor 16. This capability is not present in any of the mechanical scanning systems which cannot be moved readily to track the eye and which are difficult to alter to accommodate the eyes of different animals or different pupillometer-to-subject distances. A further increase in resolution can also be attained by using special high resolution closed circuit television systems having different scanning patterns such as those which have been developed for industrial uses.

The third element of the pupillometer is the means for analyzing the video signal to determine the number of scanning lines which traverse the image of the pupil during each cycle of the scanning pattern. The incorporation of this element in a television pupillometer constitutes a major improvement because it eliminates the need for expensive circuitry of the types used in the two Asano, et al. television pupillometers. These circuits, the pulse duration analyzer and the flying spot scanner, did not produce acceptable results because their response was affected by the difference in the video signal level caused by the change in contrast between the pupil and the iris image.

Particularly in the case of the pulse duration analyzer, the relative contrast between the pupil and the iris was of prime importance as it determined the maximum difference in clipping levels. Where the relative difference in contrast, and therefore the difference in clipping levels, was small; the degree of sharpness of the image of the pupil-iris boundary was of prime importance as it was not possible to wave shape the video signal to any significant extent prior to its transmission to the video clipper without changing the video pulse width and thereby adversely affecting the accuracy of the measurement. Thus when the eye moved from the optical axis on the plane of focus and the image of the pupil-iris boundary became blurred, large deviations in measurement accuracy occurred because the video pulse edges were no longer sharply defined as required for a precise measurement of pulse duration.

By incorporating analyzing means of the type described, no such restrictions on the accuracy of the instrument are present because simple, reliable circuits are used to detect whether or not a scanning line has traversed the pupil image; a determination that can be made without reference to the iris or the location or sharpness of the image of the pupil-iris boundary.

In the drawing of FIG. 2, electronic circuitry which comprises the analyzing means is contained within the cabinet housing the monitor 16 and is generally located in the area identified by the reference numeral 18.

As will be described in greater detail below, the analyzing means generates an output count pulse signal which is functionally related to the number of scanning lines which traverse the image of the pupil during each cycle of the scanning pattern or raster. This count pulse signal is used to drive means for calculating a dimension of the pupil from information on the number of scanning lines which traverse the image of the pupil, generated by the analyzing means and contained in the count signal. The calculating means may comprise an indicating device such as meter 20 calibrated in pupil dimension, a digital computer 22 or a chart recorder 24 having one recording track 26 for indicating the magnitude of the stimulus applied to the pupillary system and having one recording track 28 for indicating the measured size of the pupil.

As described above, the pupillometers of this invention detect the presence of the pupil by sensing the almost complete lack of reflection of incident radiation by the pupil. This concept can be understood better by examining oscillogram 30 of FIG. 3, spacially related to FIG. 1 for the purposes of explanation, which is a simplified representation of a video signal generated by scanning the eye 10 of FIG. 1 along scanning line 32. At the left hand side of the oscillogram 30, a combination retrace blanking and horizontal synchronizing (sync) pulse 34 appears which is used to control the scanning and cathode ray tube (CRT) circuits of the monitor 16 as is normally done in television systems. As the image of the eye is scanned from left to right on the camera tube, the beam first covers the image of the sclera. As the sclera almost totally reflects the incident radiation from the source 14, the amplitude of the video signal remains near the "white level" 36. As the beam scans the iris image, the amplitude of the video signal jumps to an amplitude 38 because the iris only partially reflects the incident radiation from the source 14. When the beam traverses the pupil image, the video signal amplitude jumps the "black level" 40 because the pupil reflects almost no incident radiation.

As the scanning continues, the video signal amplitude returns to amplitude 38 and then to amplitude 36 where it remains until the end of the scanning line at which time another combination blanking and sync pulse 34 appears.

When the image of the eye is scanned along a line such as 42 which does not traverse the pupil, the video signal amplitude does not reach amplitude 40 but instead the video signal generates an oscillogram 30 which contains a level 38' (represented by a dashed line) in place of black level 40.

To determine whether a scanning line has traversed the pupil portion of the eye's image, each segment of the video signal between the sync pulses 34 is examined to determine whether any part of the signal has an amplitude which exceeds that of a comparison point 44 located at a level exceeding amplitude 38 but not reaching the black level 40. Notice that the comparison point 44 can be located very near the black level 40 so as to be safely beyond any change in the amplitude of level 38 caused by the variation in the pigmentation of the iris between one subject and another. The block diagram of the system) which performs this function is shown in FIG. 4.

As shown in FIG. 4, the television camera system 12 generates three separate signals; namely, a video signal, a horizontal sync signal (including the blanking portion), and a vertical sync signal.

The video signal and the horizontal sync signal are transmitted to the two input terminals of INHIBIT gate 50 with the horizontal sync signal being transmitted to inhibitor terminal 52. The INHIBIT gate 50 transmits only the image portions of the video signal applied to its input and not the sync pulse 34 portions which are inhibited because, as periodic signals, they contain no information.

The image portion of the video signal is transmitted to wave shaper 54 which removes high frequency noise caused by thin, sharp, black lines in the image, such as those generated by eyelashes, and other causes. The wave shaper 54 also shapes the leading edges of the pulses of the video signals to improve the switching response of later portions of the circuit.

The shaped image portion of the video signal is transmitted to an amplitude comparator 56 having its signal amplitude comparison point set near the video black level such as the comparison point 44 shown in FIG. 3. When the amplitude of the pupil part of the image of the video signal reaches the comparator's signal amplitude comparison point, the comparator generates a count signal. As shown in FIG. 3, the comparison point is set so that it is attainable during the image portion of the video signal only by that part of the video signal related to the pupil. For this reason, the accuracy of the pupillometer systems of this invention is very high because it is solely the presence or absence of a pupil image, independent of the iris background, that determines whether a count pulse will be generated.

The amplitude comparator's count pulses, one count pulse being generated each time the image of the pupil is scanned by one of the lines of the scanning raster, are transmitted to amplifier 58 to increase their power before being fed to the remaining portions of the system.

The amplifier 58 is provided with three output terminals 60, 62 and 64. Terminal 60 is connected to the monitor 16 so that the output count pulses can be combined with the video signal received from the camera system 12 and displayed in visual form on the monitor 16 CRT as a bright line known as the display of measurement adequacy marker. This will be described in detail below.

While it is possible to obtain useful information simply by connecting a pulse counter to the output of the amplifier 58 to obtain a number which is functionally related to pupil size, most researchers and clinicians prefer to receive computer processed output data in terms such as pupil size or in formats which are indicative of the pupillary system's response characteristics such as a Bode plot, a Nyquist diagram, a transfer function, or a one or two-number indicator which is a function of the variance of the pupillary system's performance from some accepted standard.

To acomplish this result, terminal 62 is connected to the input of the digital computer 22 which is programmed to analyze the information it receives in the form of count pulses from the amplifier 58 and to provide output data in the desired form. Vertical sync pulses are also transmitted to the computer 22 from the television camera system 12 for the purpose of identifying the beginning and the end of each scanning field.

For many purposes, the computational capabilities of a large computer are not required as all that is needed is data on the instantaneous pupil size or a record of pupil size as a function of time. In these cases, terminal 64 of the amplifier 58 may be connected to the input of an integrating amplifier 66. By adjusting the time constant of the integrating amplifier 66 to be within a few multiples of the field scanning time, the integrating amplifier output signal will be an analog signal whose magnitude is a function of the number of count pulses per field and therefore the size of the pupil. Because of the relatively large number of count pulses generated during a scanning field, averaging circuits may be used in place of the peak voltage detecting means of prior art pupillometers to obtain a reasonably ripple-free as well as accurate analog output signal. This analog signal may then be used to drive the output indicating meter 20 or the response track recorder of the chart recorder 24.

A more detailed description of the system of FIG. 4 highlighting the simplicity of the circuitry will now be undertaken in conjunction with FIG. 5.

As described above, the camera system 12 video and horizontal sync signals are applied to the input and inhibitor terminals, respectively, of the INHIBIT gate 50 which can be combined in the same circuit module as the wave shaper 54 and is so identified in FIG. 5 by enclosing these combined elements in the box identified by the reference numerals 50/54.

The wave shaper 54 comprises a low-pass filter, which eliminates high frequency noise such as that caused by eyelashes and integrates the video signal, followed by an active double differentiator. The low-pass filter comprises resistor 100 and capacitor 102 while the active differentiator is composed of transistor 104, resistors 106 and 108, and capacitors 110 and 112. In effect, the wave shaper adds the first derivative of the signal to the signal for the purpose of making the leading edges of the signal pulses steeper to improve the switching reliability of the amplitude comparator 56.

The INHIBIT function is incorporated in the wave shaper circuit by adding bias resistors 114 and 116 to the base circuit of transistor 104 as shown. During the image portions of the video signal, the NPN transistor 104 is biased into its conducting mode by resistor 114 which is connected to the positive terminal of the power supply. During the sync pulse portions of the video signal, however, a large negative pulse taken from the camera system horizontal sync generator circuit is applied to terminal 52 of resistor 116. This drives the base bias negative with respect to the emitter and gates off transistor 104 so that the sync pulses are not transmitted to the amplitude comparator. Where a digital pulse output containing only the number of pulses equal to the number of lines which have scanned the pupil image is not required, as in the case where only an analog signal is needed, the INHIBIT resistor 116 can be eliminated. In this case, 262 additional output count pulses will be generated during each scanning field because the sync pulses which pass through the wave shaper also will trigger the amplitude comparator. The effect of these extra count pulses can be nullified by adjusting the gain and balance controls of the integrating amplifier to null out this constant input.

The output signal of the wave shaper is transmitted through a high-pass filter, composed of resistor 120 and capacitor 122, to the amplitude comparator 56. The high-pass filter serves as a D.C. block and also aids in steepening the leading edges of the pulses in the video signal.

The amplitude comparator contains two transistors 124 and 126. Transistor 124 is normally biased off while transistor 126 is normally biased on. The transistors 124 and 126 will switch states momentarily and generate an output count pulse if a positive pulse of sufficient magnitude is applied to the base of transistor 124. The minimum pulse amplitude required for the comparator to switch states is a function of the D.C. bias level on the base of transistor 124 and this in turn is a function of the values of bias resistors 128, 130 and 132. Clearly, by making the base bias of the transistor 124 more positive, a smaller pulse amplitude is required to generate a count pulse. The signal pulse amplitude which is required to initiate this switching action to generate a count pulse is called the amplitude comparator's signal comparison point and it is controlled in this circuit by the operator's adjustment of potentiometer 128.

The output count pulses of the amplitude comparator 56 are transmitted to amplifier 58 for the purpose of increasing their power level. As shown in FIG. 5, the amplifier 58 may comprise a simple transistor emitter follower.

As previously noted, the count pulses from the amplifier 58 are transmitted to the monitor 16 to form a display of measurement adequacy marker. This novel feature provides the operator with a visual display of the leading or trailing (with respect to the direction of scanning) edge of the boundary of the area actually being measured at the time.

Referring to FIG. 5, a sketch of a monitor image of an eye under examination is drawn in the block representing the monitor 16. The sclera 140, the iris 142 and the pupil 144 are all plainly visible. Located within the pupil image 144, is a white crescent-shaped marker 146 having an identical radius of curvature as that of the leading boundary 148 of the pupil 144. The marker 146 is formed by applying count pulses to the grid-cathode circuit of the monitor 16 CRT to cause the image to brighten each time a count pulse is generated. Clearly, if the analyzing means is not functioning properly, the white crescent 146 will not appear behind the leading edge of the pupil. If for example the potentiometer 128 is improperly adjusted so that the diameter of the iris rather than the pupil is being measured, the white marker 146 will appear behind the leading edge of the iris. Similarly, if spurious signals are generated by noise in the electronics system or objects such as eyelashes, white markers will appear on the monitor screen to instantly warn the operator of a malfunction and to give him information on what portion of the image is introducing error. Conversely, the failure to obtain a marker 146 also serves as an indication of malfunction as does the presence of an erratic marker.

The marker 146 is shifted to a position behind the leading edge of the area being measured so that both the marker and the edge will be clearly and independently visible. The shift is accomplished by transmitting the count pulses from the amplifier 58 to the monitor 16 through a delay network 150 so that the count pulse transmission time to the monitor 16 is increased. Preferably, the delay network should provide a variable delay which can be adjusted by the operator so that the marker can be moved from a position coincident with the leading edge of the boundary (or trailing edge in some embodiments) being measured, for positive identification of the area, to some other location which facilitates easy viewing.

A simple, but very efficient, delay network can be provided by combining an amplitude comparator, such as the comparator module 56 of FIG. 5, with a low-pass filter, such as an R-C filter similar to resistor 100 and capacitor 102, having one or more variable elements. Count signals from the amplifier 58 are then transmitted to the low-pass filter where they are delayed by the requisite time in response to the setting of the filter's variable elements (such as a rheostat). The delayed pulses are then transmitted to the amplitude comparator which generates count pulses of a desired width, which may be different from that of the count pulses which are transmitted to the delay network 150, for transmission to the CRT grid-cathode control circuit to produce the crescent marker 146.

The pupillometer of FIG. 2 is easily adjusted to obtain accurate results by performing a simple calibration procedure at the beginning of each new experiment.

First, the head of the subject is placed in a restraining device such as a chin rest to prevent large movements of the head. Next, a stimulator such as visual light stimulator 152 is activated to determine whether it is generating the desired pupillary system response.

Once the stimulator is properly positioned, the source 14 and the camera system 12 are adjusted to obtain a clear picture of the eye on the monitor 16 without interfering with the field of view of the eye or the operation of the stimulator. Where an animal which does not have a circular pupil, such as the cat, is used as a subject, the camera system 12 is rotated about its optical axis so that gradient line 154 (a line perpendicular to scanning lines 156 of FIG. 5) of the scanning raster is positioned parallel to the dimension of the pupil which is to be measured.

After these steps have been completed, the amplitude comparator comparison point potentiometer 128 is adjusted to obtain the proper display of measurement adequacy marker for the pupil and two radiation absorbent circles are sequentially placed in front of the pupil plane. One circle should have a diameter approximately equal to the smallest pupil dimension to be measured while the second should have a diameter approximately equal to the maximum pupil dimension to be measured. By alternately placing the circles in front of the pupil plane, the gain and balance controls of the integrating amplifier can be adjusted so that the meter 20 and the char recorder 24 will read directly in pupil size across the full scale of their indicating ranges. By feeding the sizes of the circles into the computer 22, the computer can automatically calculate the calibration coefficient for converting information on the number of scanning lines traversing the pupil into a direct pupil dimension readout.

The pupillometer is now calibrated for use and need not be recalibrated until there is a change in the pupillometer-to-lens distance.

A preferred embodiment of a pupillometer of this invention has been described which has general application in both research and clinical environments. It will be readily appreciated by those skilled in the art that a number of modifications are possible for the purpose of optimizing the performance of a particular pupillometer for some experiment. Thus, television systems having circular or spiral scanning lines may be used in place of the straight line, interlaced scanning system described here. Where binocular measurements are needed, multiple lens or multiple camera systems may be connected to a single analyzing circuit to avoid the need for two complete and separate systems. Further, different comparator, wave shaper and amplifier circuits may be substituted for the modules described where improved convenience, economy or performance are achieved.

For example, where a pupillometer of this invention is to be used in an experiment in which the pupil-iris boundary is relatively well defined and where it is desired to have a display of measurement adequacy marker for the entire pupil-iris boundary, as would be the case where information on the position of the eye as well as the size of the pupil is required, the wave shaper 54 of FIG. 5 can be replaced with a differentiator so that only pulses representing the derivative of the video signal are transmitted to the amplitude comparator which in turn generates one or more count pulses which identify both the leading and trailing boundaries. A Schmitt trigger can also be used as an amplitude comparator where a trailing edge marker is desired.

As a feature of the systems of this invention is great flexibility in use and instrumentation, it is easily appreciated that a number of modifications, such as those suggested above, can be made to the instrument which has been described to obtain embodiments which, while structurally different from the illustrated embodiment, are nevertheless within the scope of the invention which is defined by the following claims.

What is desired to be claimed by Letters Patent of the United States is:

1. A dynamic pupillometer for measuring a dimension of a pupil of an eye comprising:
    a television camera system including means for scanning an image of the eye along lines of a predetermined scanning pattern to produce a video signal of the image; and
    means for analyzing the video signal to determine the number of scanning lines which traverse the image of the pupil during each cycle of the scanning pattern,
    said means for analyzing including amplitude comparing means including means for establishing a signal amplitude comparison point that is attainable by said video signal only during the image portion thereof representative of scanning the pupil,
    said amplitude comparing means also including means responsive to the amplitude of the image portion of the video signal reaching said signal amplitude comparison point for providing a count pulse to thereby indicate that the pupil intersects a line of said predetermined scanning pattern then scanned.

2. The dynamic pupillometer of claim 1 comprising in addition:
    means for calculating a dimension of the pupil from a signal, generated by the analyzing means, functionally related to the number of scanning lines which traverse the image of the pupil during a scanning cycle.

3. The dynamic pupillometer of claim 1 comprising in addition:
    means for calculating a dimension of the pupil from the number of count pulses.

4. The dynamic pupillometer of claim 1 wherein the analyzing means comprise in addition:
    a wave shaper containing means for transmitting a derivative of the video signal to the amplitude comparing means.

5. The dynamic pupillometer of claim 1 comprising in addition:
    means for integrating the count pulses to obtain an analog signal which is a function of pupil size.

6. The dynamic pupillometer of claim 1 wherein the predetermined scanning pattern is:
    a raster of equally spaced apart lines.

7. The dynamic pupillometer of claim 1 comprising in addition:
    means for irradiating the eye with invisible radiation to form an image of the eye.

8. The dynamic pupillometer of claim 1 wherein the predetermined scanning pattern is:
    a raster of straight lines.

References Cited

UNITED STATES PATENTS

| | | | |
|---|---|---|---|
| 3,036,568 | 5/1962 | Stark. | |
| 3,321,575 | 5/1967 | Lewczyk | 178—6 |
| 3,390,229 | 6/1968 | Williams | 178—6 |

DAVID SCHONBERG, Primary Examiner

P. A. SACHER, Assistant Examiner

U.S. Cl. X.R.

178—6; 351—6